US 8,176,881 B2

(12) United States Patent
Arensmeier et al.

(10) Patent No.: US 8,176,881 B2
(45) Date of Patent: May 15, 2012

(54) SYSTEMS AND METHODS FOR CONTROLLING A WATER HEATER

(75) Inventors: Jeffrey N. Arensmeier, Fenton, MO (US); Donald E. Donnelly, St. Louis, MO (US); Edward B. Evans, St. Louis, MO (US); John S. Haefner, St. Louis, MO (US); G. Scott Vogel, Fenton, MO (US)

(73) Assignee: Emerson Electric Co., St. Louis, MO (US)

( * ) Notice: Subject to any disclaimer, the term of this patent is extended or adjusted under 35 U.S.C. 154(b) by 823 days.

(21) Appl. No.: 12/333,625

(22) Filed: Dec. 12, 2008

(65) Prior Publication Data
US 2009/0101085 A1 Apr. 23, 2009

Related U.S. Application Data

(63) Continuation-in-part of application No. 11/936,080, filed on Nov. 6, 2007, now Pat. No. 7,647,895, which is a continuation-in-part of application No. 11/052,307, filed on Feb. 7, 2005, now Pat. No. 7,290,502, and a continuation-in-part of application No. 11/480,154, filed on Jun. 30, 2006.

(51) Int. Cl.
*F24H 9/20* (2006.01)
(52) U.S. Cl. .................................... 122/14.22; 709/224
(58) Field of Classification Search ................ 122/14.2, 122/14.22, 14.21; 340/577, 578, 581, 584, 340/588; 709/223, 224
See application file for complete search history.

(56) References Cited

U.S. PATENT DOCUMENTS

| | | | |
|---|---|---|---|
| 3,782,881 A | 1/1974 | Feeney | 431/90 |
| 3,887,325 A | 6/1975 | Finger et al. | 431/6 |
| 4,467,178 A * | 8/1984 | Swindle | 392/449 |
| 4,568,821 A | 2/1986 | Boe | 219/419 |
| 4,581,697 A | 4/1986 | Jamieson | 700/11 |
| 5,797,358 A | 8/1998 | Brandt et al. | 122/448.1 |
| 6,053,130 A | 4/2000 | Shellenberger | 122/504 |
| 6,345,769 B2 | 2/2002 | MacIntyre | 237/8 R |
| RE37,745 E | 6/2002 | Brandt et al. | 122/14.2 |
| 6,662,757 B2 | 12/2003 | Lesage | 122/14.21 |
| 6,766,771 B1 | 7/2004 | Hotton | |
| 6,877,462 B2 | 4/2005 | Adams et al. | 122/14.1 |
| 7,015,432 B2 * | 3/2006 | Valbh et al. | 219/486 |
| 7,032,543 B1 | 4/2006 | Akkala et al. | 122/14.31 |
| 7,167,813 B2 * | 1/2007 | Chian et al. | 702/183 |
| 7,500,453 B2 * | 3/2009 | Lindberg | 122/14.2 |
| 7,596,749 B2 | 9/2009 | Motoyama et al. | 715/237 |
| 7,647,895 B2 * | 1/2010 | Donelly et al. | 122/14.21 |
| 2008/0021749 A1 | 1/2008 | Hope | 705/7 |
| 2008/0126557 A1 | 5/2008 | Motoyama et al. | 709/232 |
| 2009/0293816 A1 * | 12/2009 | Patterson et al. | 122/14.22 |

* cited by examiner

*Primary Examiner* — Gregory A Wilson
(74) *Attorney, Agent, or Firm* — Harness, Dickey & Pierce, P.L.C.

(57) ABSTRACT

A control for a water heater is provided that comprises a pressure switch for sensing a predetermined level of airflow sufficient for maintaining proper burner operation, and a temperature sensing means for sensing the temperature of the water in the tank. The control further comprises a processor for controlling the operation of the burner to maintain the water temperature above a predetermined value. When the processor receives a signal from the pressure switch or temperature switch indicating a malfunction, the processor shuts down the burner and subsequently attempts to restart the burner. The processor will lock-out further burner operation after a predetermined number of consecutive shut downs occurs, and will communicate any malfunction information to a remote display device.

21 Claims, 13 Drawing Sheets

SYSTEMS AND METHODS FOR CONTROLLING A WATER HEATER

CROSS-REFERENCE TO RELATED APPLICATIONS

This application is a continuation-in-part of U.S. patent application Ser. No. 11/936,080, entitled "Systems And Methods For Controlling A Water Heater", filed Nov. 6, 2007, which is a continuation-in-part of U.S. patent application Ser. No. 11/052,307, entitled "System And Methods For Controlling A Water Heater", filed Feb. 7, 2005, now U.S. Pat. No. 7,290,502, and a continuation-in-part of U.S. patent application Ser. No. 11/480,154, entitled "Communicating Control For A Fuel Fired Heating Appliance", filed Jun. 30, 2006, which are herein incorporated by reference.

FIELD OF THE INVENTION

The present invention relates generally to power-vented gas water heaters and, more particularly, to the control of a power vent water heater.

BACKGROUND OF THE INVENTION

In gas-fired water heater applications, flame arrestors are commonly used to restrict propagation of the burner flame through an air inlet to flammable vapors that may be present outside the appliance. In residential water heaters having flame arrestors, lint or other substances may restrict air flow through the flame arrestor and cause insufficient air flow to the burner or an elevated flue temperature. Commercial water heaters, which typically have a power-vented means for exhausting combustion air from the burner, may also experience the same restriction of air flow through a flame arrestor. When airflow becomes restricted to the point that a pressure switch subsequently opens, the water heater burner will shut off. The water heater would restart the burner again and encounter the same problem, which would lead to the repeated cycling of burner operation.

SUMMARY OF THE INVENTION

The present invention is directed to a gas-fired water heater having a burner that heats water in a tank, and a flame arrestor in an air inlet to the burner. In one embodiment, the water heater includes a control that comprises a pressure switch for sensing a predetermined level of airflow sufficient for maintaining proper burner operation, and a water temperature sensing means for sensing the temperature of the water in the tank. The control further comprises a processor connected to the water temperature sensing means and connectable to the burner for controlling the operation of the burner for heating the water in the tank to a desired temperature. The processor is further connected to the pressure switch to receive a communication from the pressure switch indicating a burner shut down resulting from an insufficient level of airflow. The processor discontinues burner operation when a predetermined number of consecutive shut downs resulting from insufficient airflow occurs before the water is heated to a desired temperature.

In a second embodiment of the invention, the water heater control comprises a temperature switch that opens upon sensing a flue temperature above a predetermined temperature, and a processor for controlling the operation of the burner. The processor is further connected to the temperature switch to receive a communication from the temperature switch indicating a burner shut down resulting from an elevated flue temperature, wherein the processor discontinues burner operation when a predetermined number of consecutive shut downs in which the burner is shut down for more than a predetermined time occurs before the water is heated to the desired temperature.

In a third embodiment of the invention, the water heater includes a control that comprises a pressure switch that opens upon sensing at least a predetermined level of airflow, and a temperature switch that opens upon sensing a flue temperature above a predetermined temperature. The control further comprises a processor further connected to the temperature switch to receive a communication from the temperature switch indicating a burner shut down resulting from an elevated flue temperature, and connected to the pressure switch to receive a communication from the pressure switch indicating a burner shut down resulting from an insufficient level of airflow. The processor locks out further burner operation after either a first predetermined number of consecutive shut downs occur in which the burner is shut down within a predetermined time of initiating burner operation, or after a second predetermined number of consecutive shut downs in which the burner is shut down for more than a predetermined time as a result of an open temperature switch.

Further areas of applicability of the present invention will become apparent from the detailed description provided hereinafter. It should be understood that the detailed description and specific examples, while indicating embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Corresponding reference numerals indicate corresponding parts throughout the several views of the drawing.

DETAILED DESCRIPTION OF THE EMBODIMENTS

The following description of embodiments of the invention is merely exemplary in nature and is in no way intended to limit the invention, its application, or uses.

Figure 1:
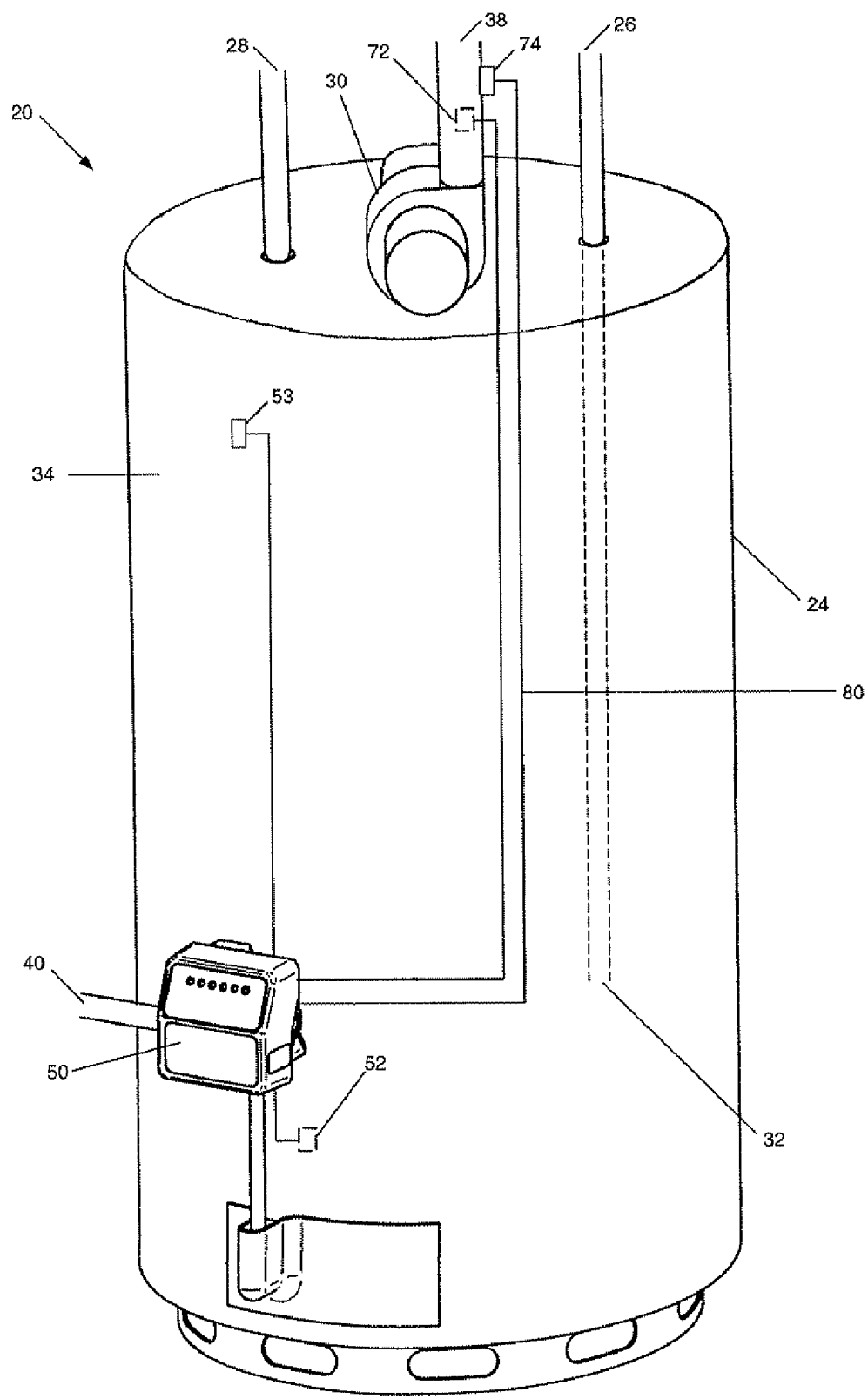
FIG. 1 is a perspective view of one embodiment of a water heater in accordance with the present application.

A gas water heater according to one embodiment of the present invention is indicated generally by reference number 20 in FIG. 1. The heater 20 has a tank 24 into which cold water enters via a cold water inlet pipe fitting 26. Cold water entering the bottom 32 of the tank is heated by a gas burner 848 (FIG. 4) beneath the tank. The burner can be lighted, for example, using an igniter 58 (shown schematically in FIG. 2). Heated water rises to the top 34 of the tank 24 and leaves the tank via a hot water pipe 28. Combustion gases leave the water heater via a flue 38 and a blower 30 that provides ventilation of combustion gases through the flue 38. An electrically operated gas valve 60 is preferably enclosed within the controller 50 shown in FIG. 2, and controls gas flow through a gas supply line 40 to the burner. It should be noted that the gas valve may alternatively be separate from the controller 50 in other embodiments of the present invention, and the scope of the invention is not limited to the example of the various embodiments as further described below.

Figure 4:
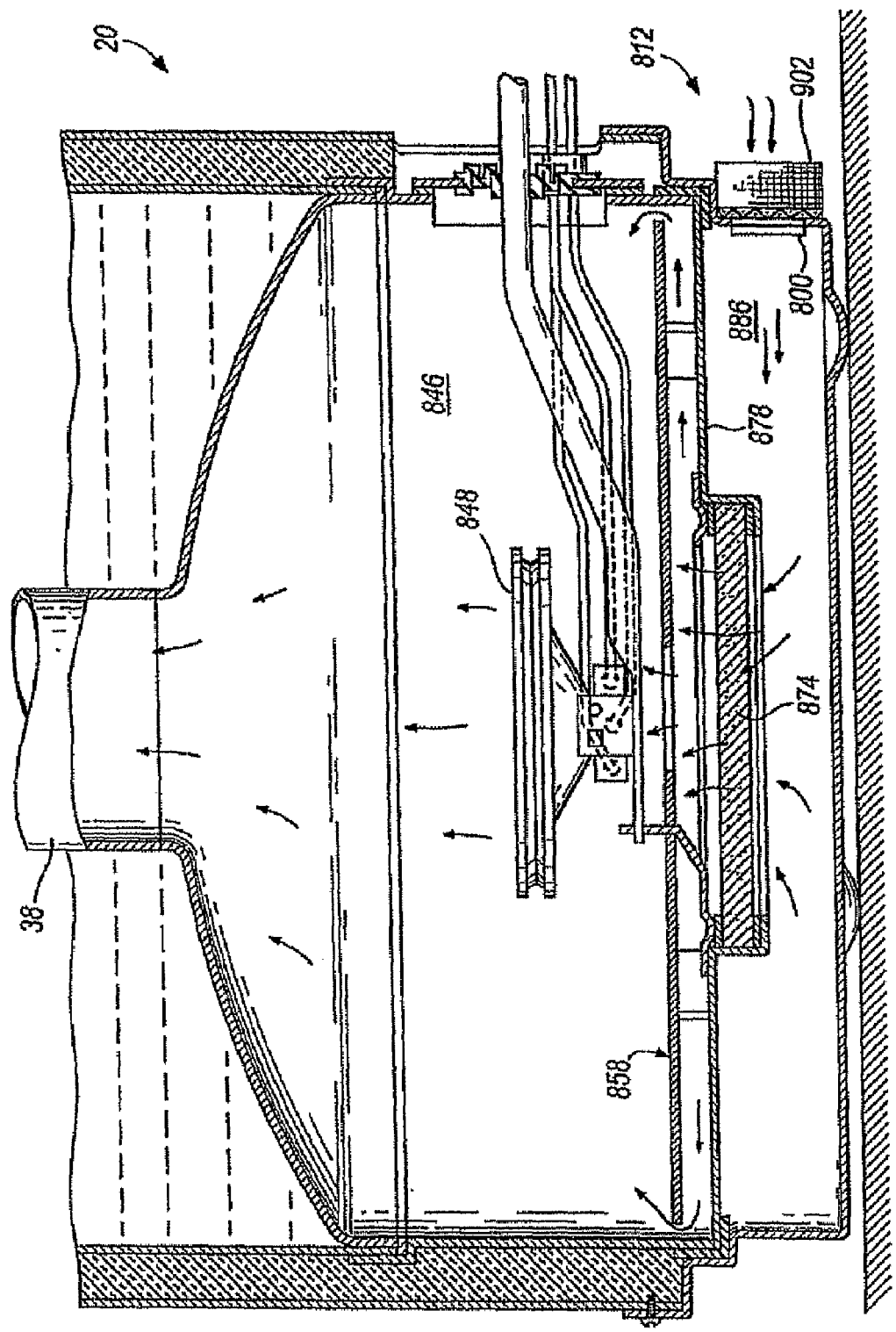
FIG. 4 is a sectional view of the bottom portion of the water heater.

The bottom of the water heater 20 is shown in greater detail in FIG. 4. The water heater 20 includes a base pan 812 supporting the water tank 24. The base pan 812 may be constructed of stamped metal or plastic. The bottom of the water heater 20 defines a combustion chamber 846 having therein the gas burner 848. The water heater 20 includes a radiation shield 858, a flame arrestor 874, a flame arrestor support 878 and a plenum 886.

The flame arrestor 874 permits substantially all flammable vapors that are within flammability limits to burn near its top surface while preventing substantially all flames from passing from the top surface, through the flame arrestor 874, out the bottom surface, and into the plenum 886. The flame arrestor 874 is constructed of materials that resist thermal conduction from the upper surface to the lower surface to further reduce the likelihood of ignition of flammable vapors in the air plenum 886.

The base pan 812 is configured to provide the primary structural support for the rest of the water heater 20. The base pan 812 and the flame arrestor support 878 together define the air plenum 886. The base pan 812 includes an air intake aperture or air inlet 800 to the air plenum 886. The air inlet 800 is covered by a screen 902. The screen 902 is positioned upstream of the flame arrestor 874, and is made of a wire mesh material that acts as a lint or bug screen so that undesired objects or particles are not allowed to enter the plenum 886 leading to the combustion space. The screen 902 filters the great majority of airborne particles that may interfere with the operation of the flame arrestor 874. Without the screen 902, particles would accumulate on the flame arrestor 874, and could possibly cause flare-ups on the bottom surface of the flame arrestor if the debris caught fire. Such buildup in debris could also restrict the amount of air flowing through the flame arrestor 874, thereby interfering with combustion.

As indicated by the arrows in FIG. 4, air flows through the screen 902, into the plenum 886, through the flame arrestor 874, and around the radiation shield 858 or through apertures 902 in the radiation shield 858. Substantially all of the air that is necessary for combustion must pass through the flame arrestor 874. The hot products of combustion rise up through the flue 38, and heat the water by convection and conduction through the flue 38.

Other features of the lower portion of the water heater 20 are preferably the same as disclosed in U.S. Pat. Nos. 6,216,643 and 6,295,952, both of which are incorporated herein by reference.

A system for controlling the water heater 20 includes a controller 50 positioned, for example, adjacent the tank 24. As further described below, the controller 50 is configured to sense flammable vapors, air flow through the burner, the flue temperature, and the water temperature in the tank 24. The controller 50 also can responsively activate or deactivate the igniter and the gas valve, as further described below.

Figure 2:
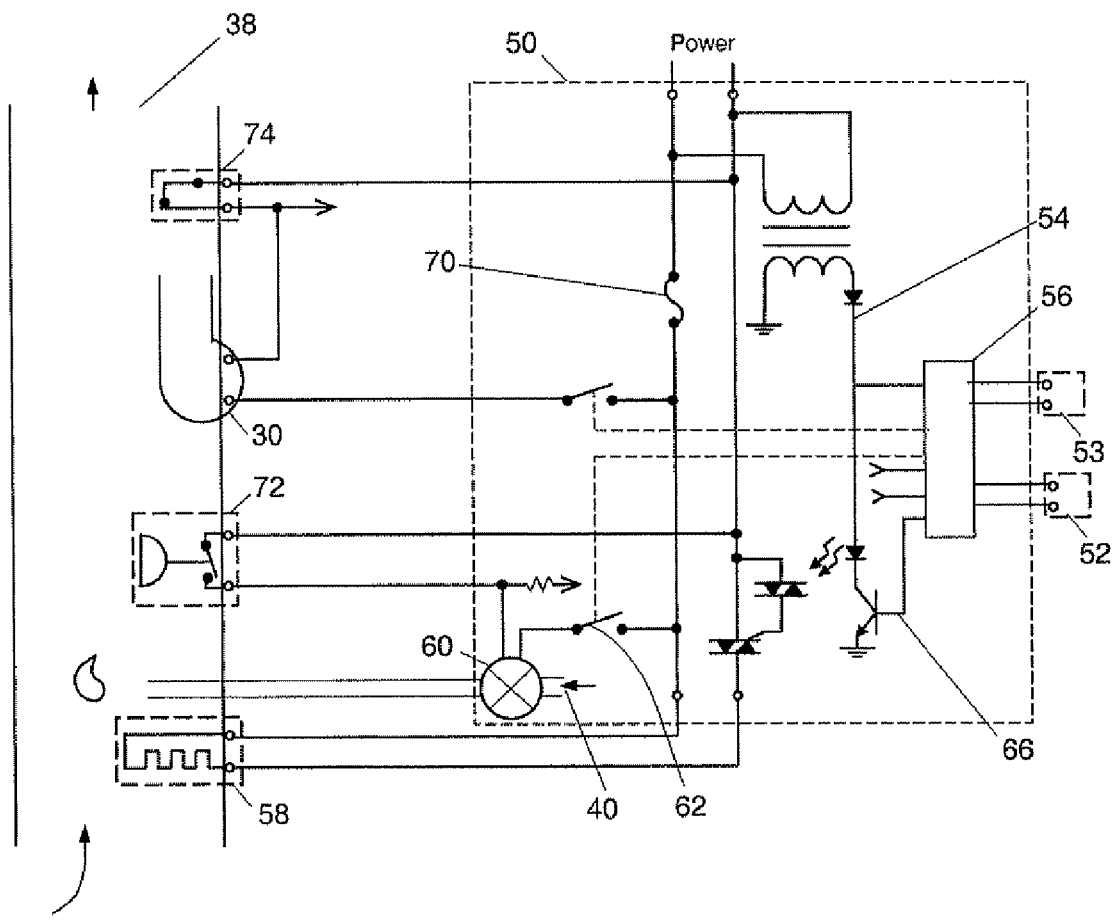
FIG. 2 is a schematic diagram of one embodiment of a water heater controller in accordance with the present application.

Referring to FIG. 2, a water temperature sensor 52 connected to the controller 50 senses a temperature having a relation to the temperature of the water inside the tank. For example, the sensor 52 may be a tank surface-mounted temperature sensor or the like. However, other embodiments of the invention can alternatively use a temperature probe or other sensor suitable for enabling sensing the water temperature in the tank. To prevent scalding, the controller 50 can shut off the water heater 20 in FIG. 1 if the water temperature sensor 52 senses a temperature exceeding a predetermined maximum value.

The control preferably comprises a low voltage power supply circuit 54 that provides operating power to a processor 56, e.g., a microprocessor that receives input from the water temperature sensor 52 and controls activation of the igniter 58 and gas valve 60. It should be noted that the processor 56 in this embodiment comprises a microprocessor chip having memory internal to the device. However, the processor may also suitably comprise a separate memory chip in communication with the processor, and should not be limited in scope to the microprocessor of this embodiment. A low voltage, e.g. 5 VDC, power supply is provided to enable the processor 56 and other circuitry to control heater operation. Other voltages for the processor 56 and/or power supply 54 are possible in other configurations. In this first embodiment, the power supply is preferably a small transformer and diode circuit.

The processor 56 controls at least one gas valve actuator, and in the present invention, controls an actuator 62 for operating the electrically operated gas valve 60. The processor 56 also controls an igniter actuator 66 for operating the igniter 58. A thermal fuse 70 interrupts the supply of power if the water temperature exceeds a predetermined upper limit. Thus, the fuse 70 serves as a backup for the water temperature sensor 52 to prevent excessively high water temperatures.

The controller 50 monitors temperature change as signaled by the sensor 52. If the controller 50 determines, for example, that the water temperature has dropped below a predetermined temperature, the controller 50 establishes a call for heat as further described below.

The controller 50 appropriately establishes a call for heat in response to sensing a condition indicating a need for heating, such as a water temperature that is below a predetermined temperature value, for example. The processor 56 subsequently controls switching of power to the blower 30, then to the igniter 58, followed by initiating the flow of gas through the gas valve 60 to establish burner operation. As long as the water temperature remains below a desired predetermined temperature value at which the call for heat is terminated, the call for heat will continue and the burner will continue to raise the water temperature. In one embodiment of the present invention, the desired or predetermined temperature value for terminating a call for heat is preferably at least 120 degrees Fahrenheit. The processor 56 uses input from the water temperature sensor 52 to determine whether the predetermined temperature value for terminating a call for heat has been reached, at which point the processor 56 ends the call for heat.

The controller 50 is configured to sense air flow to the burner through a pressure switch 72. The pressure switch 72 closes when sensing a predetermined level of airflow sufficient for maintaining proper burner operation. The pressure switch 72 is connected in series with the gas valve 60, such that the opening of the pressure switch 72 interrupts power to the gas valve 60 to cause the gas valve 60 to close. The processor 56 is also in communication with the pressure switch 72, as shown in FIG. 2. The processor 56 is thus capable of detecting when the pressure switch 72 senses a value indicative of air flow insufficient for proper burner operation. The minimum level of airflow for proper operation is preferably that at which combustion produces less than 0.04 percent of carbon monoxide in the flue gases. The pressure switch 72 is adapted to sense a restricted air flow that will produce at least 0.04 percent of carbon monoxide during combustion operation. For example, in this embodiment the pressure switch 72 is a pressure switch that directly senses the pressure of the combustion air flow. In other embodiments, the pressure switch 72 comprises an analog pressure sensor, which may be adapted to indirectly sense restricted air flow at the inlet, flue, or other appropriate location.

In the first embodiment, the controller 50 is also configured to sense the temperature of the flue gas through a temperature cutout switch 74. Other embodiments, however, may employ a temperature sensor or a thermistor to appropriately sense the temperature of the flue gas. An increase in the flue exhaust temperature is also indicative of an insufficient air flow to the burner. The temperature switch 74 is preferably connected to the processor 56 in a manner such that the processor can monitor when the temperature switch 74 opens. The temperature switch 74 may also be placed in series with the power vent blower motor, such that a flue gas temperature above a predetermined value will cause the switch to open and interrupt power to the blower to shut off air flow. Shutting off the blower will also cause the pressure switch 72 to open and the gas valve to close. The processor 56 can therefore also indirectly sense the opening of the temperature switch 74 through the opening of the pressure switch 72. It is also envisioned that in another embodiment the temperature switch 74 is placed in series with the gas valve, such that a flue gas temperature above a predetermined value will cause the switch to open and interrupt power to the gas valve.

Figure 3:
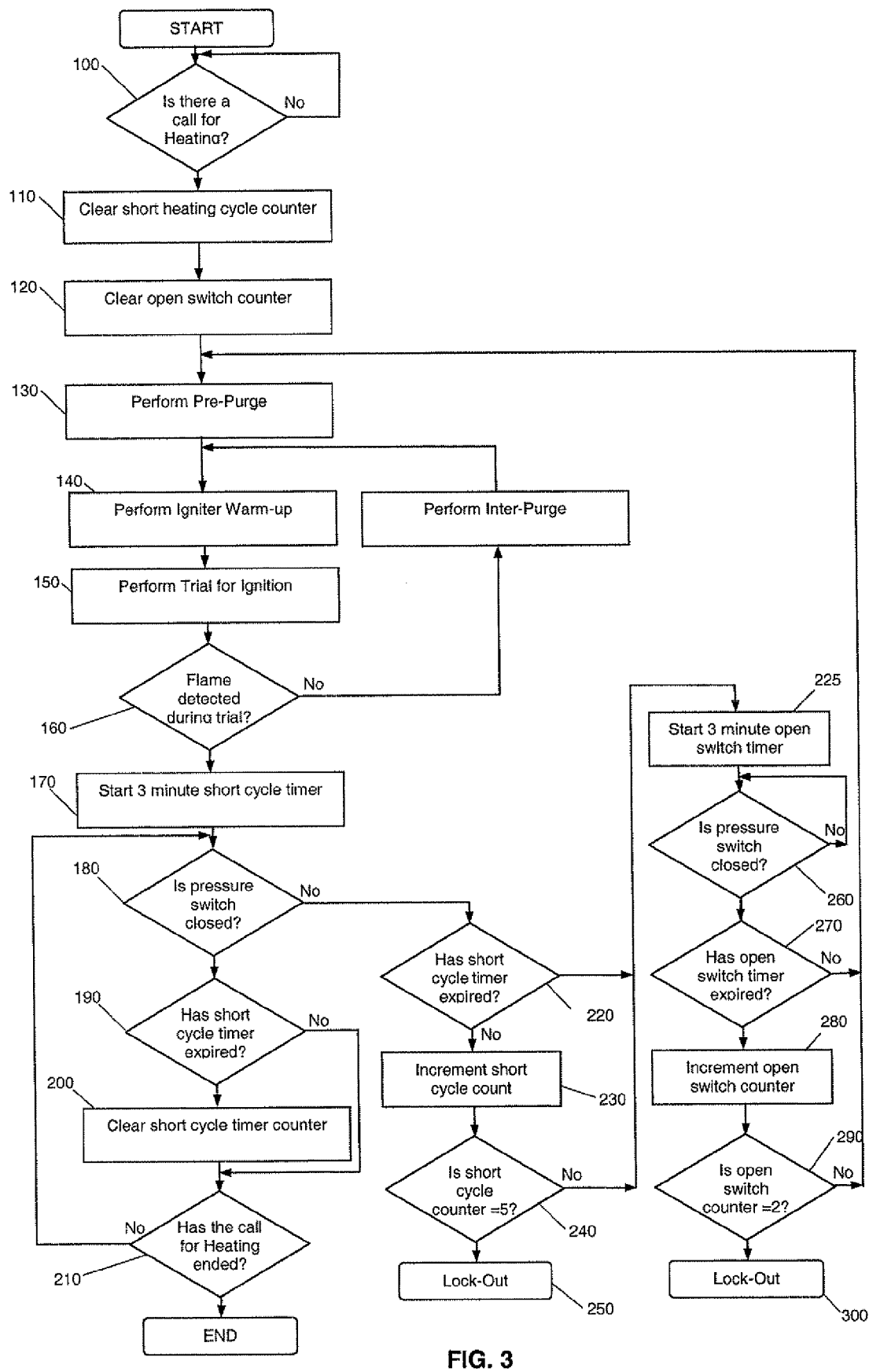
FIG. 3 is a flow chart of the operation of a water heater controller in accordance with the present application.

In operation, the processor 56 monitors the pressure switch 72 and/or the temperature switch 74 to control the operation of the burner. One example method of operation is illustrated in FIG. 3 where the processor 56 monitors the pressure switch 72 to control the operation of the burner. However, it should be understood that the processor 54 can monitor the temperature switch 74, or some other parameter, similar to the monitoring of the pressure switch illustrated in FIG. 3. The processor 56 preferably comprises a software program for controlling the operation of the burner for heating the water in the tank. The processor 56 first evaluates whether the sensed water temperature 52 is below a predetermined temperature value to determine whether a call for heat is required at step 100. When the processor 56 initiates a call for heat at step 100, the software program proceeds to clear a stored short cycle counter value and an open switch counter value at steps 110 and 120. The blower 30 is then turned on at step 130 to purge combustion air and initiate the supply of air to the burner. In normal operation, the blower ramps up to speed to cause the pressure switch 72 to close. The program then begins the igniter warm up steps at 140 and 150. The processor 56 checks a flame sensor to determine whether a burner flame has been established at step 160. After a flame has been established, the burner operates normally to heat the water in the tank to the desired temperature.

Once a flame has been established, the control also monitors the pressure switch 72 to ensure sufficient airflow is present for proper burner operation. Upon establishing flame, the program begins a short cycle timer period of a first predetermined time period at step 170. In one embodiment, the first predetermined timer period is about three minutes, but may be any time period sufficient to monitor a short burner cycle due to a shut down. If the water heater is functioning normally, the pressure switch 72 remains closed and the burner continues to heat the water until the call for heat ends at step 210. If at any time the processor 56 detects an open pressure switch at step 180, the program determines whether the short cycle timer period has expired at step 220. If the program determines the pressure switch 72 opened before the three minute short cycle timer period expired at step 220, the program will increment a short cycle counter at step 230 from the default zero value to a value of one. Since the short cycle counter value is not equal to five at step 240, the program starts an open switch timer at step 225 and checks whether the pressure switch is closed at step 260.

It should be noted that when the pressure switch 72 has opened at step 180, the program is still calling for operation of the blower even though electrical power to the gas valve is interrupted by the pressure switch to shut off the burner. Thus, the blower could still be running at step 260, and the pressure switch may re-close after the burner has shut off. However, a restriction at the air inlet could lead to insufficient airflow and cause the flue temperature to gradually increase and open the temperature switch 74, which interrupts power to the blower motor and causes the pressure switch 72 to open. Thus, the blower could also be off at step 260. The temperature switch 74 would continue to interrupt power to the blower until the flue temperature has cooled enough for the temperature switch 74 to close again. Thus, the blower 30 will remain off for at least a predetermined time period while the flue temperature cools. For this reason, the program will monitor an open switch timer of a predetermined time period at step 225. The open switch timer period in this embodiment is about three minutes, but may be any time period sufficient to monitor the opening of the temperature switch 74 after a restriction of air flow causes the flue temperature to elevate to a threshold temperature, which is in the range of about 300° Fahrenheit to about 460° Fahrenheit depending on the heater application.

If the pressure switch 72 opens at step 180 (shutting down the burner) and subsequently closes again at step 260 before the open switch timer expires at step 270, the program will return to step 130 to initiate a pre-purge and request a restart of burner operation at steps 140 and 150. Once a flame has been established at step 160, the control again monitors the pressure switch 72 to ensure sufficient airflow is present for proper burner operation. If at step 180 the processor 56 detects the pressure switch 72 has opened again before the three minute short cycle timer period expired at step 220, the program will increment the short cycle counter at step 230 from a value of one to two and restart the burner. If this open pressure switch failure occurs repeatedly, the program will continue to increment the short cycle counter at step 230. If five consecutive occurrences of the pressure switch opening within the three minute short cycle time period transpires before the water temperature is raised to the desired temperature, the short cycle counter will increment to five and the program will initiate a lock-out of further burner operation at step 250.

If the pressure switch 72 opens at step 180 (shutting down the burner) and subsequently closes again at step 260 after the three minute open switch timer has expired at step 270, the program will increment the open switch counter at step 280. The open switch counter would be incremented from a default zero value to a value of one. Since the open switch counter is less that two at step 290, the program will return to step 130 to initiate a pre-purge and request a restart of burner operation at steps 140 and 150. If upon establishing flame the pressure switch opens again at step 180 after the three minute short cycle timer period expires at step 220, the program starts the open switch timer at step 225. If the pressure switch 72 does not close at step 260 until after the three minute open switch timer period expires at step 270, the program will increment the open pressure switch counter at step 280 from the value of one to two. When two consecutive occurrences of the pressure switch opening after the three minute open switch timer has expired (at step 290), the program will initiate a lock-out of further burner operation at step 300. Thus, the control is adapted to monitor the temperature switch 74 through the opening of the pressure switch 72, to ensure sufficient airflow is present for proper burner operation.

In another embodiment of the present invention, the controller 50 may be connected to the temperature switch 74 via a wire 80 (shown in FIG. 1). The program could then determine by the connection via wire 80 when the temperature switch 74 is open before step 220, and immediately increment the open switch counter 280 based on the open temperature switch 74. This would eliminate the need to monitor the time that the pressure switch 72 is open at step 270, since the temperature switch 74 would be directly monitored by the processor 56.

Figure 5:
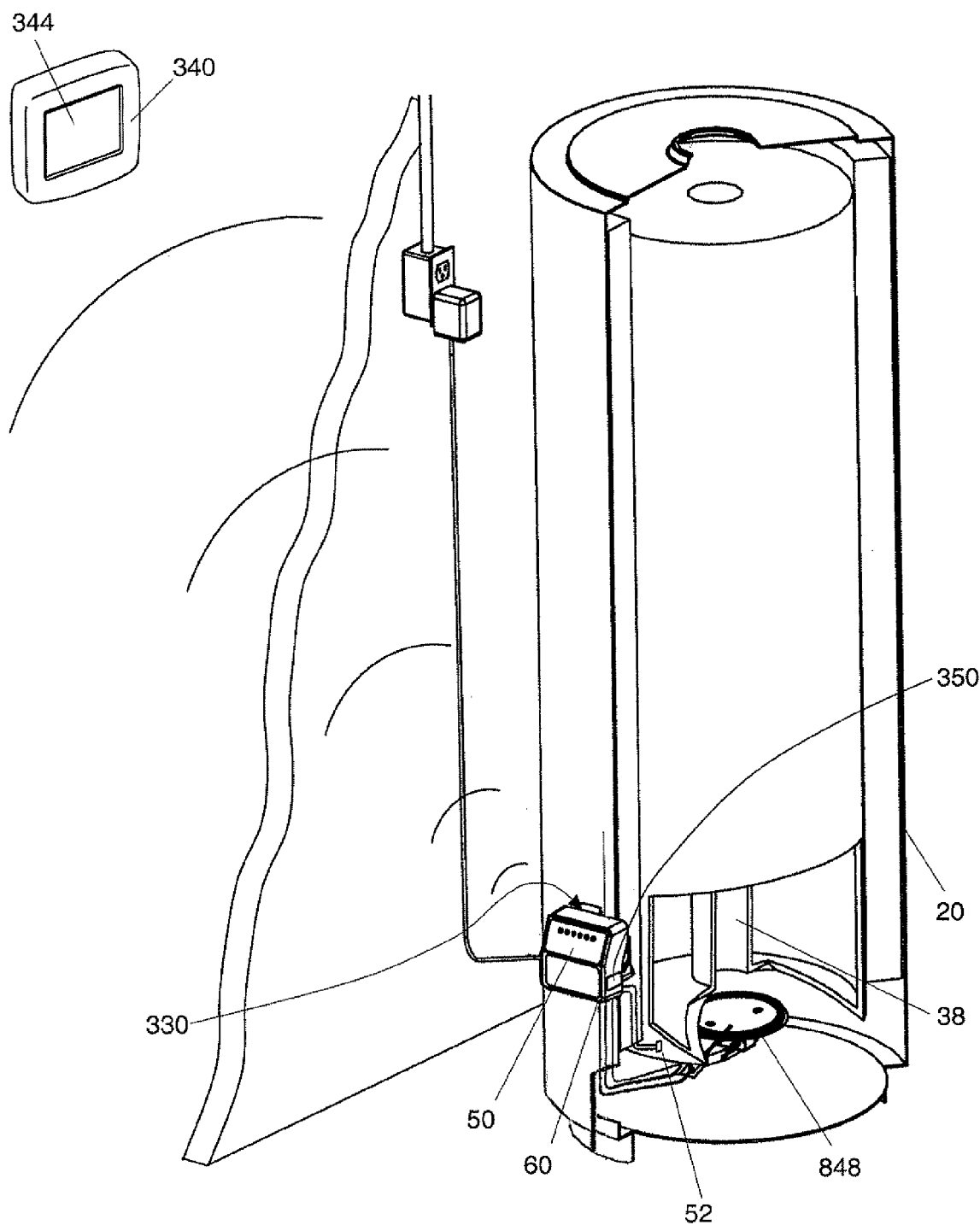
FIG. 5 is a perspective view of a water heater according to another embodiment of the present application.
Figure 6:
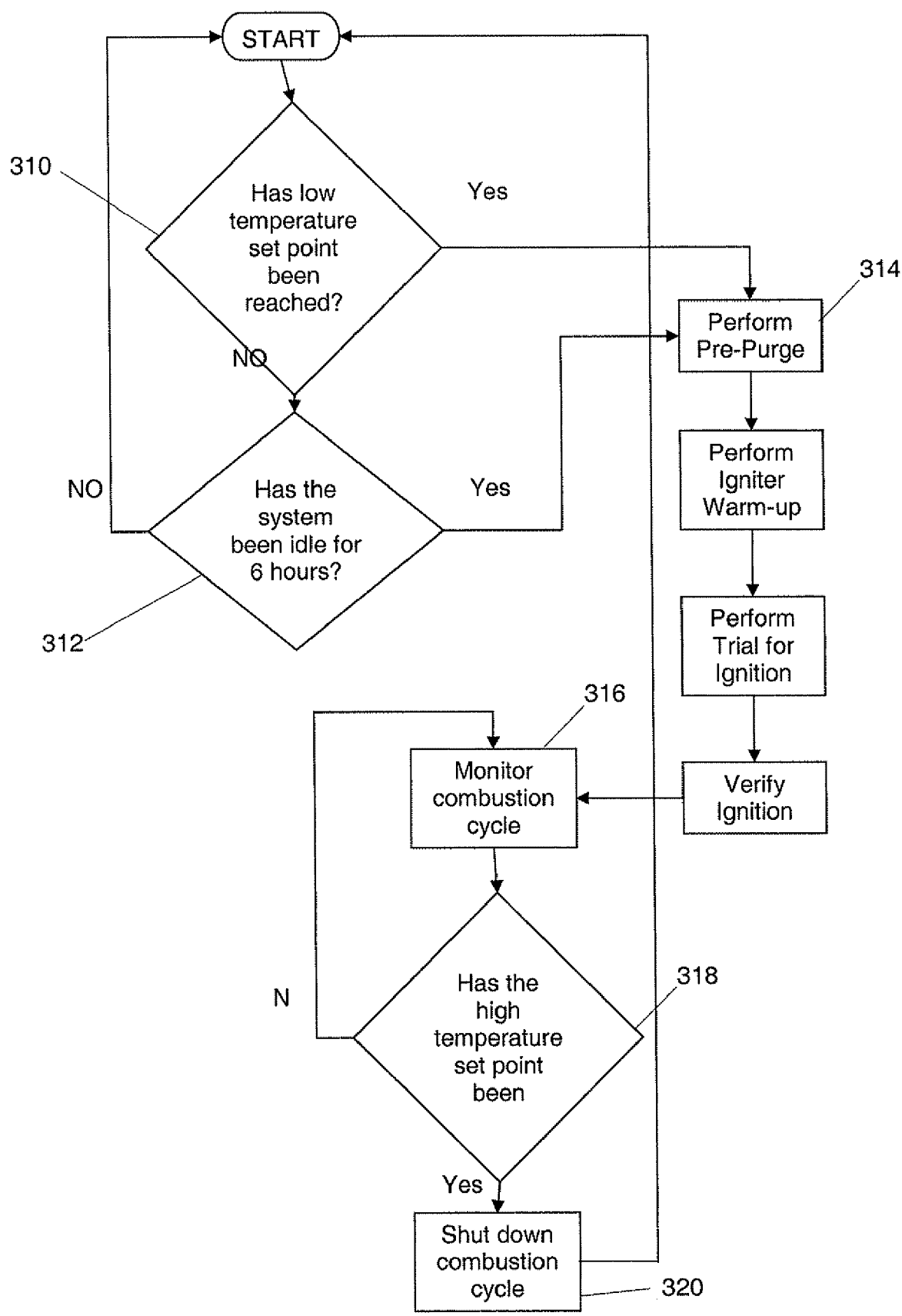
FIG. 6 is a flow chart of the operation of a water heater controller in accordance with the present application.

In a third embodiment shown in FIG. 5, a controller 50 for a fuel fired water heater appliance 20 is provided that has a burner 848, a gas valve 60 (shown integral with the controller 50), and a water temperature sensing means 52. The water heater controller 50 provides for controlling the operation of the gas valve 60 and fuel fired water heater 20, and is capable of monitoring a water temperature sensing means 52 to determine whether to open the gas valve 60 to activate the burner. Referring to FIG. 6, a programmed processor of the controller 50 is configured to monitor the water temperature sensor 52 to determine at step 310 whether the water has cooled to a low temperature set point at step 310, or whether at step 312 the burner operation has been idle for a period (6 hours for example). In response to either condition, the processor of the controller 50 performs ignition steps at 314, after which the processor monitors combustion at 316 until the water has been heated to a high set point temperature, of 150 degrees Fahrenheit for example, at step 318. Where there is no water drawn from the tank, the burner may remain idle for as long as 8-9 hours before the water cools to the low set-point temperature. The start after a six hour idle period avoids cold-water complaints that may occur as a result of such a long idle period.

The water temperature sensing means 52 may comprise a thermistor that is mounted against an exterior surface of the combustion chamber as shown in FIG. 5. The sensing means 52 could also comprise a high temperature switch or a bimetal thermal-switch adapted to close at a pre-set temperature. One example of such a switch is a snap-action thermal switch 36T01 manufactured by Thermo-O-Disc, Inc.

The controller 50 is also capable of responding to an abnormal condition. The controller 50 is capable of responding to an abnormal condition by wirelessly transmitting a signal including a message indicating the presence of an abnormal condition. In the third embodiment, the controller 50 further comprises a transmitter module 330 for wirelessly transmitting digital signals. The signals wirelessly transmitted by the controller 50 are preferably received by an external device 340 such as a remote display device (or thermostat) for alerting an occupant. The remote display device (or thermostat) 340 is configured to receive the wirelessly transmitted signal and immediately display a text message on a display device 344 on the remote display device 340 (or thermostat). The remote display device 340 (or thermostat) accordingly provides for displaying the abnormal condition for the fuel fired water heater appliance 20, to alert an occupant in the space of the abnormal condition.

The signal transmitted to an external device 340 (such as a thermostat) includes a message communicated by the controller 50 that includes information relating to the abnormal condition. The transmitted message may include a text message that is displayed in its entirety by a display device of the remote display device 340. In this third embodiment, the message is displayed by the remote display device 340 independent of any input or prompting to the device by a user, such that an occupant may be alerted of an abnormal condition without the occupant having to prompt the device or thermostat for information about the appliance.

The controller 50 for controlling the operation of a fuel-fired water heating appliance 20 comprises a transmitter module 330 for wirelessly transmitting digital signals, and a microprocessor 56 (not shown in FIG. 5) for controlling the operation of the controller 50 of the fuel-fired heating appliance 20. The microprocessor 56 is in communication with the transmitter module 330, and is capable of monitoring a pressure sensor 72 and a temperature sensor 74 for determining an abnormal condition for the fuel fired water heating appliance 20. Where the controller 50 includes a display device, the microprocessor 56 responds to an abnormal condition by communicating a message containing information on the abnormal condition to the display device to display the abnormal condition. The microprocessor 56 responds to an abnormal condition by communicating a message via the transmitter module 330, whereby the transmitter module 330 transmits the message to a remote display device (or thermostat) 340 that is capable of receiving and immediately displaying the message on a display device on the thermostat for an occupant to view.

The controller 50 further comprises a universal serial bus interface 350 that is adapted to connect to a universal serial bus device (USB) portable memory device. The processor is connected to the universal serial bus and is configured to receive information relating to a service provider, including at least a name and phone number of the service provider, from an electronic flash memory in communication with the universal serial bus interface. The microprocessor 56 is in communication with the water temperature sensor 52 and the burner 848 for controlling burner operation to heat the tank's water to a desired temperature. The microprocessor 56 is further configured to monitor a pressure sensor or switch 72 to detect an insufficient level of airflow such that the burner is shut down within a predetermined period of time after initiating burner operation. The microprocessor 56 is also configured to discontinue or lock-out burner operation after the occurrence of a predetermined number of shut-downs while attempting to heat or raise the water temperature to a desired temperature. The microprocessor 56 is also configured to communicate information relating to the discontinued burner operation to a display on the controller, or to an external device. The microprocessor 56 may also be configured to retrieve and communicate the received information relating to a service provider to a display on the controller or to an external device.

Figure 7:
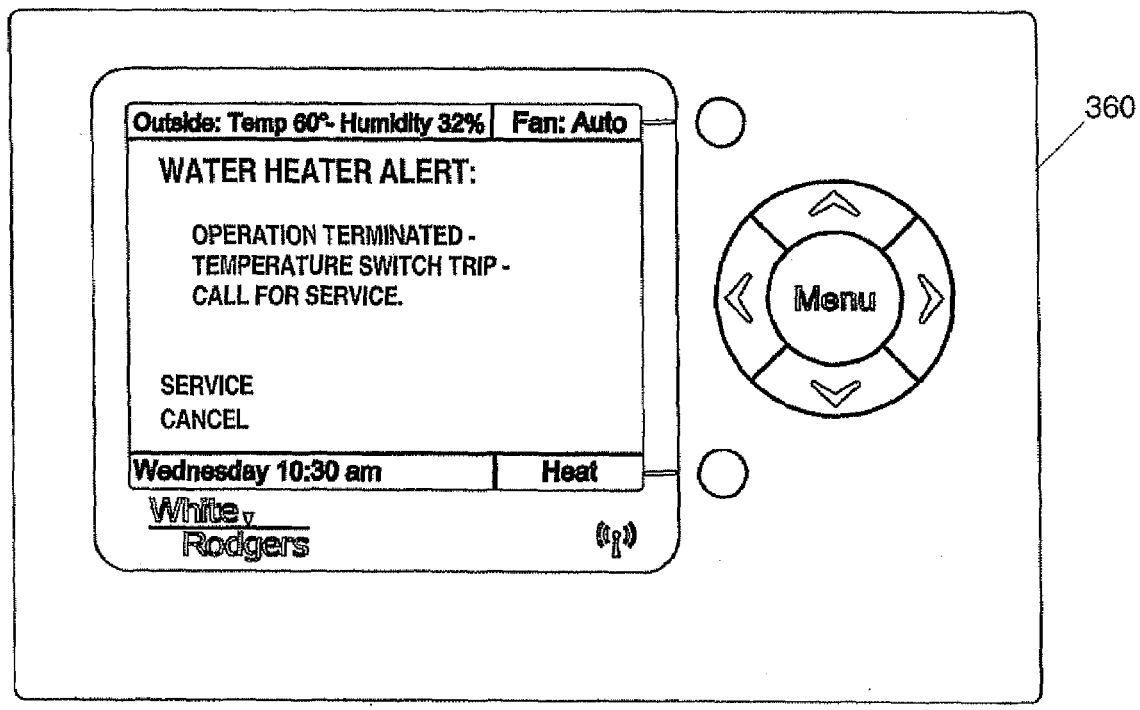
FIG. 7 is an illustration of a thermostat configured to receive and display information communicated by a water heater controller of the present application.
Figure 8:
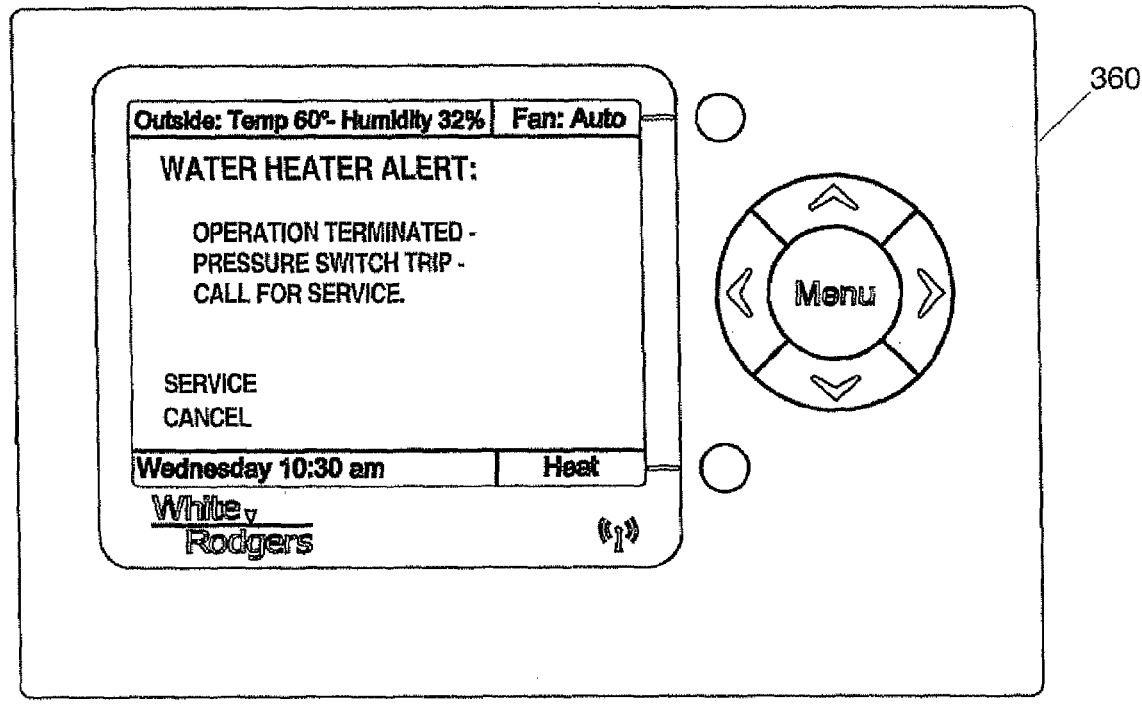
FIG. 8 is an illustration of a thermostat configured to receive and display information communicated by a water heater controller of the present application.

It should be noted that the processor 56 of the controller 50 is configured to discontinue further operation of the burner until the processor is reset and the predetermined number of shut-downs is cleared from memory. In the third embodiment, the predetermined number of consecutive shut downs may be at least two shut downs, and the predetermined time period after initiating burner operation during which the shut-down occurs is in the range of about 150 seconds to about 210 seconds. The controller 50 may also be in communication with a temperature switch 72 that opens upon sensing a flue temperature above a predetermined temperature, wherein the controller 50 is configured to communicate the sensing of a flue temperature above a predetermined threshold. The controller 50 may be configured to communicate wireless signals to an external device such as a thermostat 340 that is configured to receive the wireless signals and display information relating to a malfunction and information relating to a service provider on the thermostat's display. For example, the controller 50 may be configured to communicate to a thermostat 360 as in FIGS. 7 and 8, which is shown displaying the information of a water heater alert of a pressure switch and temperature switch malfunction respectively, as well as instructions to call for service. One thermostat capable of receiving and displaying such information is disclosed in U.S. patent application Ser. No. 11/480,154, entitled "Communicating Control For A Fuel Fired Heating Appliance", filed Jun. 30, 2006, which is incorporated herein by reference.

Figure 13:
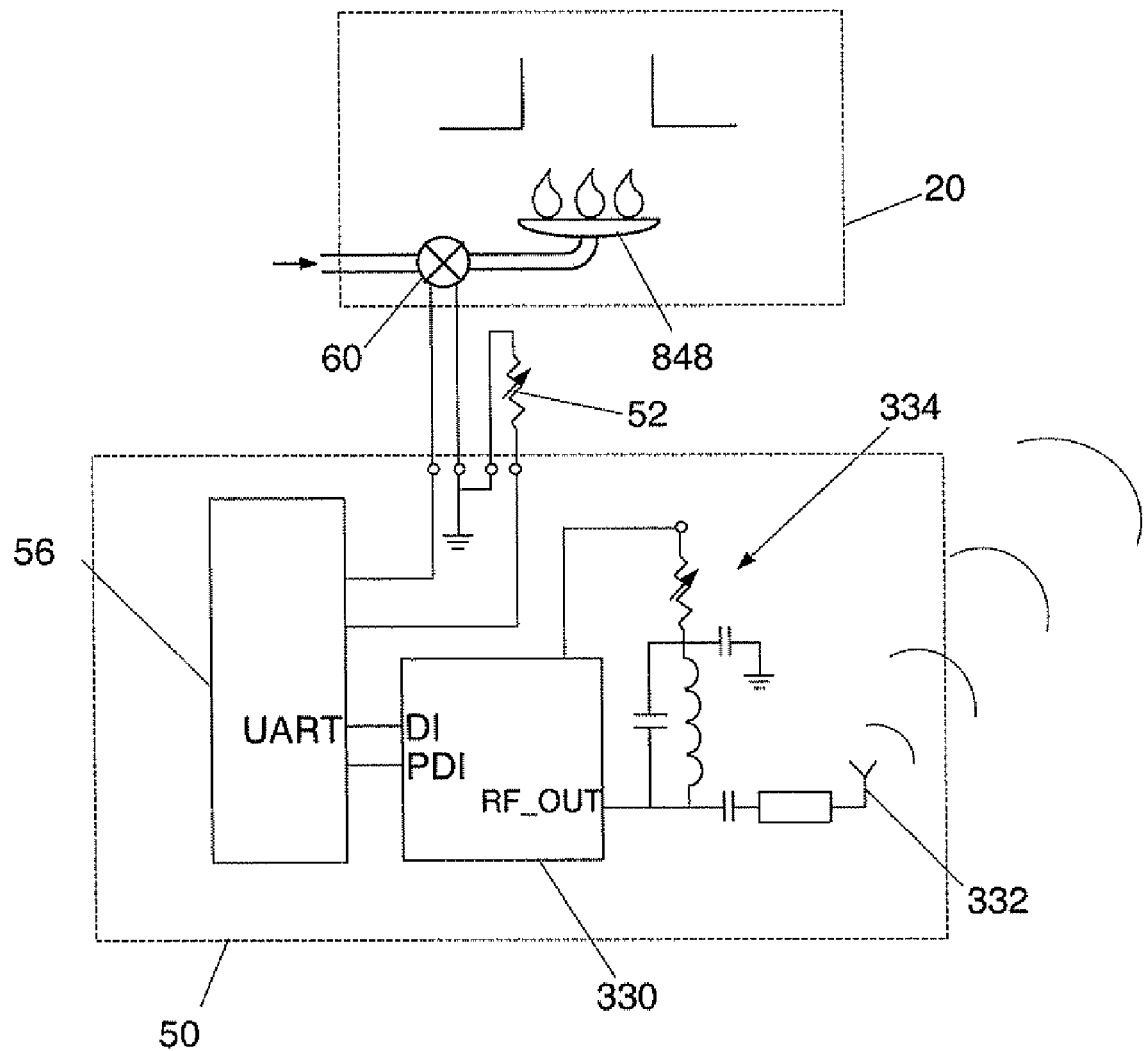
FIG. 13 is a schematic diagram of one embodiment of a water heater controller having a wireless transmitter in accordance with the present application.

Referring to FIG. 13, the controller 50 for wirelessly transmitting to a remote display device or thermostat generally comprises a transmitter module 330 that preferably includes an RF transceiver. The controller 50 and transceiver module 330 are capable of continuously transmitting a message at predetermined intervals, to assure that the signal may be properly received by the remote display device or thermostat. The transmitter device 330 is in communication with an antenna device 332 that is either trace mounted on a circuit board of the controller 50 or a transmitter circuit 334, or externally mounted. The transmitter module 330 is configured to transmit at a frequency in the range of about 915 to 918 megahertz (MHz), but may alternatively transmit at other frequencies suitable for achieving wireless communication across the same distance, such as a distance of 20 to 40 feet with low power transmission levels (under 1 watt). However, the RF transceiver 230 may alternately be configured to transmit at 433 MHz, or any other frequency suitable for wireless communication across a short range distance. One example of an RF transceiver 330 that is capable of transmitting at frequencies in the range of 915 to 917 MHz, at varying power levels is a TXM-916-ES RF Module manufactured by LINX Technologies, Inc. This RF Module includes an input for receiving a digital signal (such as from a UART output of the microprocessor 50), and an LADJ input for external adjustment and control of the transmit power up to a maximum of 7 mill amperes (+4 dBm). Another example of a transmitter may be a CC1070 wireless RF transmitter manufactured by Chipcon AS, of Germany.

Figure 9:
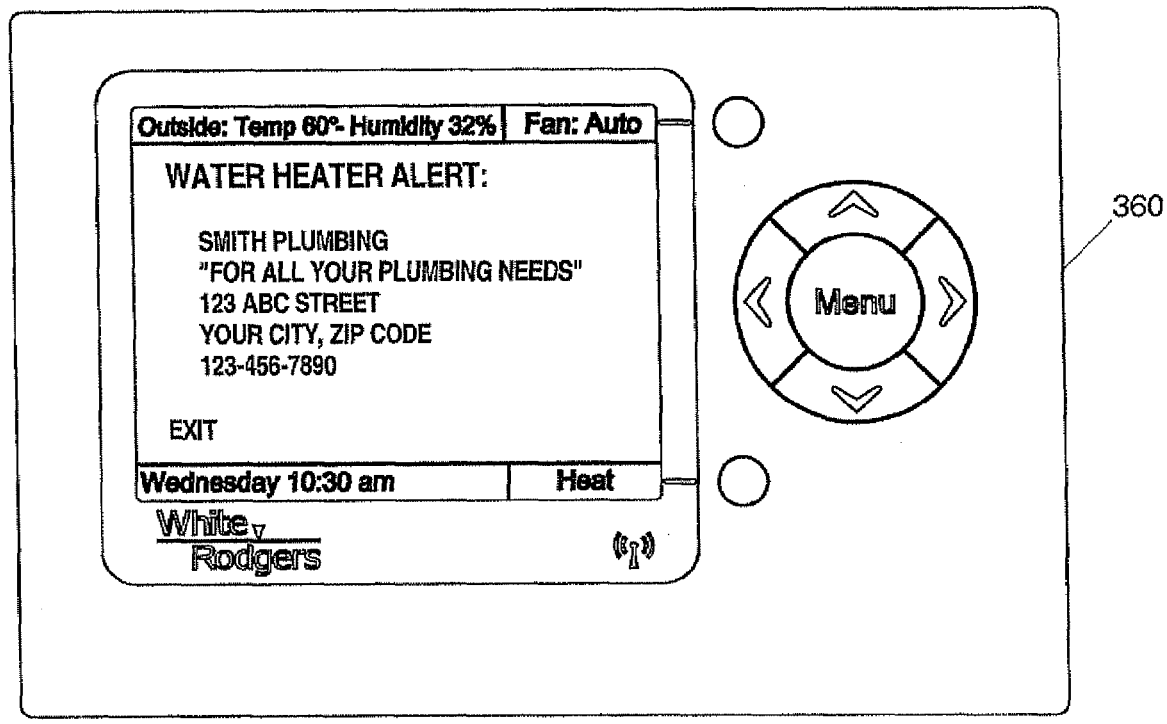
FIG. 9 is an illustration of a thermostat configured to receive and display information relating to a service provider that is input to a water heater controller of the present application.
Figure 14:
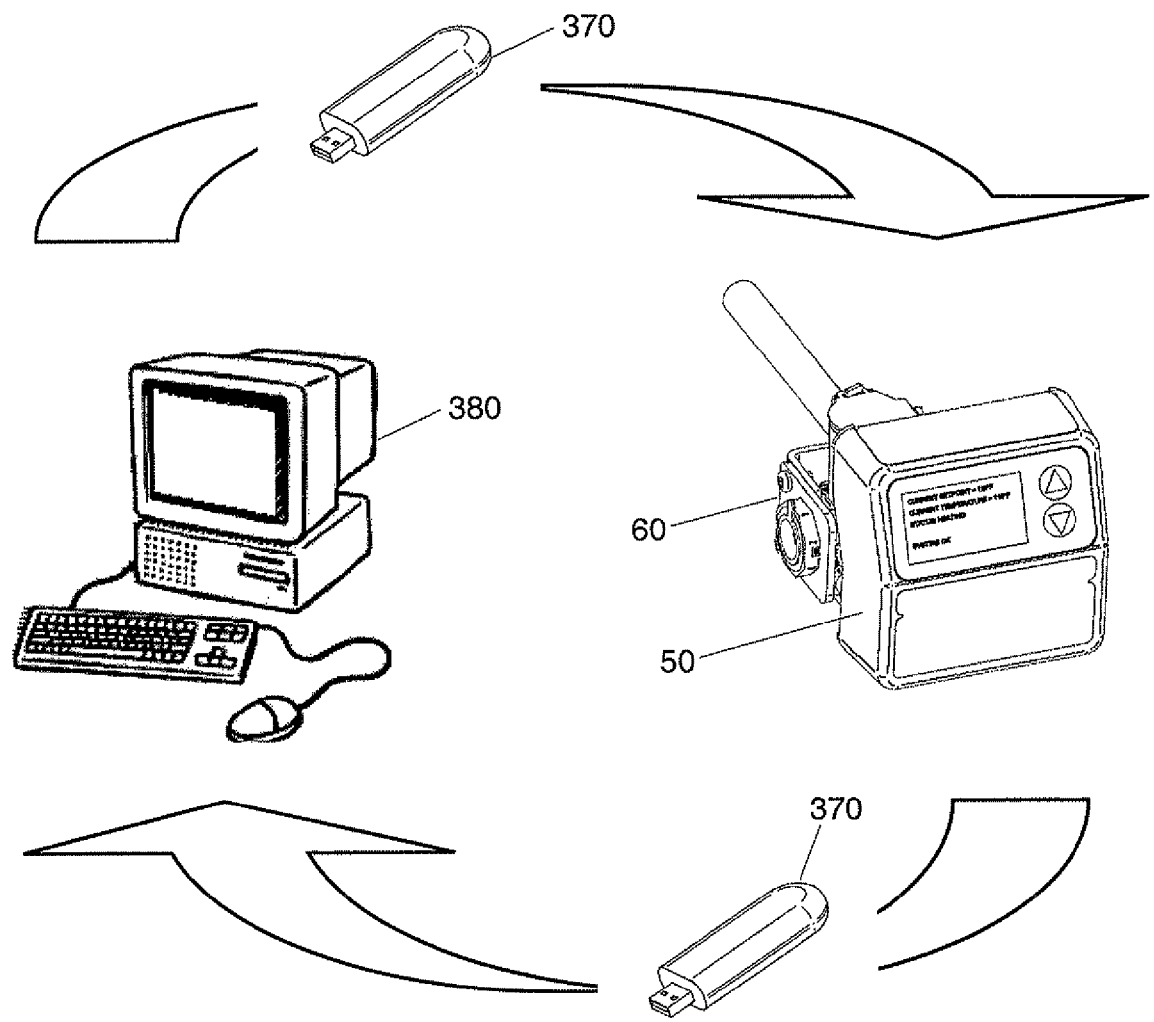
FIG. 14 is a schematic diagram of a water heater controller and Universal Serial Bus device in accordance with the present application.

Referring to FIG. 14 and the universal serial bus interface 350, the processor of the controller 50 is configured to receive information such as the name and phone number of a plumber or contractor from a USB memory device 370 that a plumber or contractor connects to the universal serial bus interface 350 at the time of installation. This feature will allow a plumber or contractor to upload their contact information into the controller 50 for future use in the event of a malfunction. Upon detecting a malfunction or shut-down, the processor 56 of the controller 50 is configured to communicate information relating to a service provider, such as the name and phone number of a contract or plumber, to a display device on the controller 50 (where a display device is present). The processor 56 may also wirelessly communicate the information relating to the service provider to a remote device such as a thermostat 360, for displaying the contact information for addressing the malfunction, as shown in FIG. 9.

It should be noted that the controller 50 may alternatively be configured to work in connection with a specific remote display device 340 shown in FIG. 5. The controller 56 may communicate via the transmitter to a remote display device 340 that is configured to receive information only, and is not configured to request information upon prompting by a user. Thus, the remote display device simply displays information communicated from the controller 50. The remote display device may also include a universal serial bus interface (not shown) that is configured to receive information such as the name and phone number of a plumber or contractor from a USB memory device that a plumber or contractor connects to the universal serial bus interface at the time of installation. Thus, a plumber or contractor can upload their contact information into the remote display device 340 for future use in the event of a malfunction. Where a malfunction or shut-down of the water heater 20 occurs, the remote display device 340 would receive communication of the malfunction information from the controller 50 of the water heater, and subsequently display the malfunction information. A service provider could also connect a USB portable memory device to the remote display device, to download information communicated by the controller 50 relating to historical malfunctions of the water heater.

Figure 10:
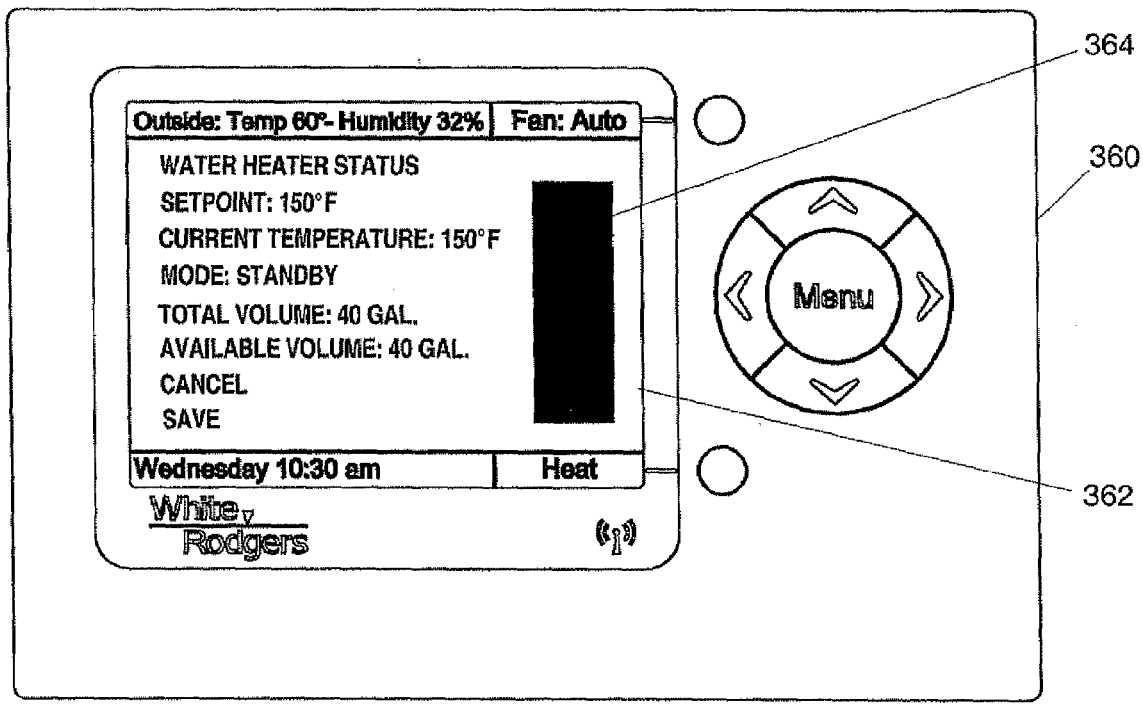
FIG. 10 is an illustration of a thermostat configured to receive and display information communicated by a water heater controller of the present application.
Figure 11:
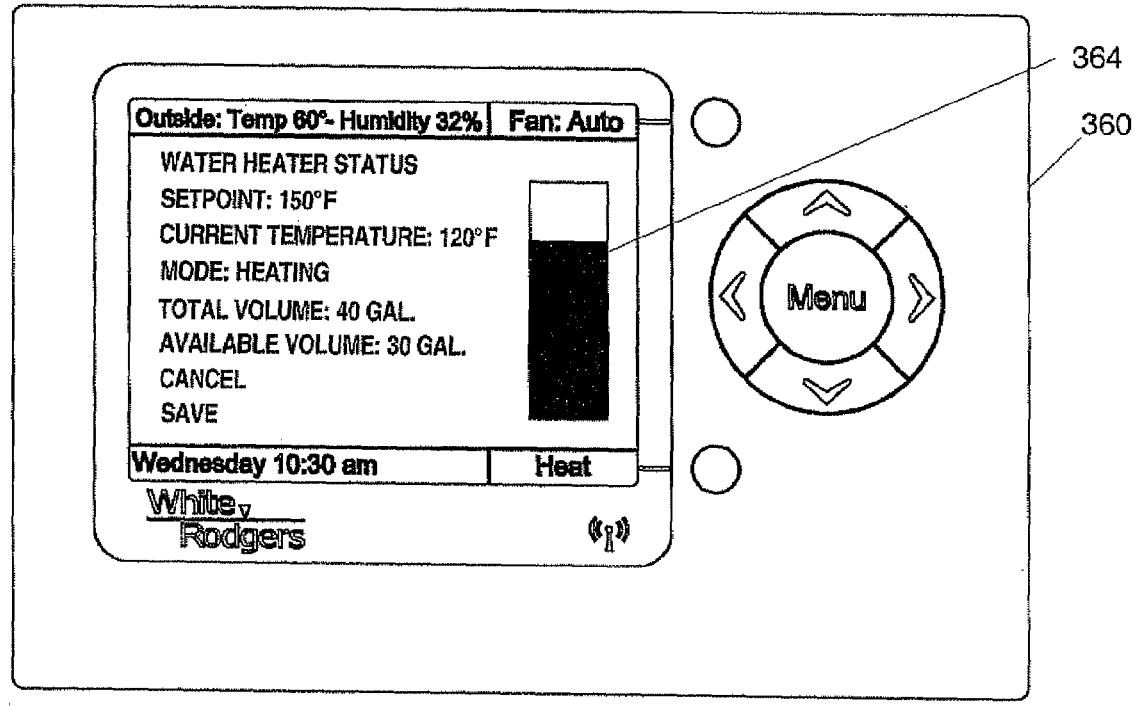
FIG. 11 is an illustration of a thermostat configured to receive and display information communicated by a water heater controller of the present application.
Figure 12:
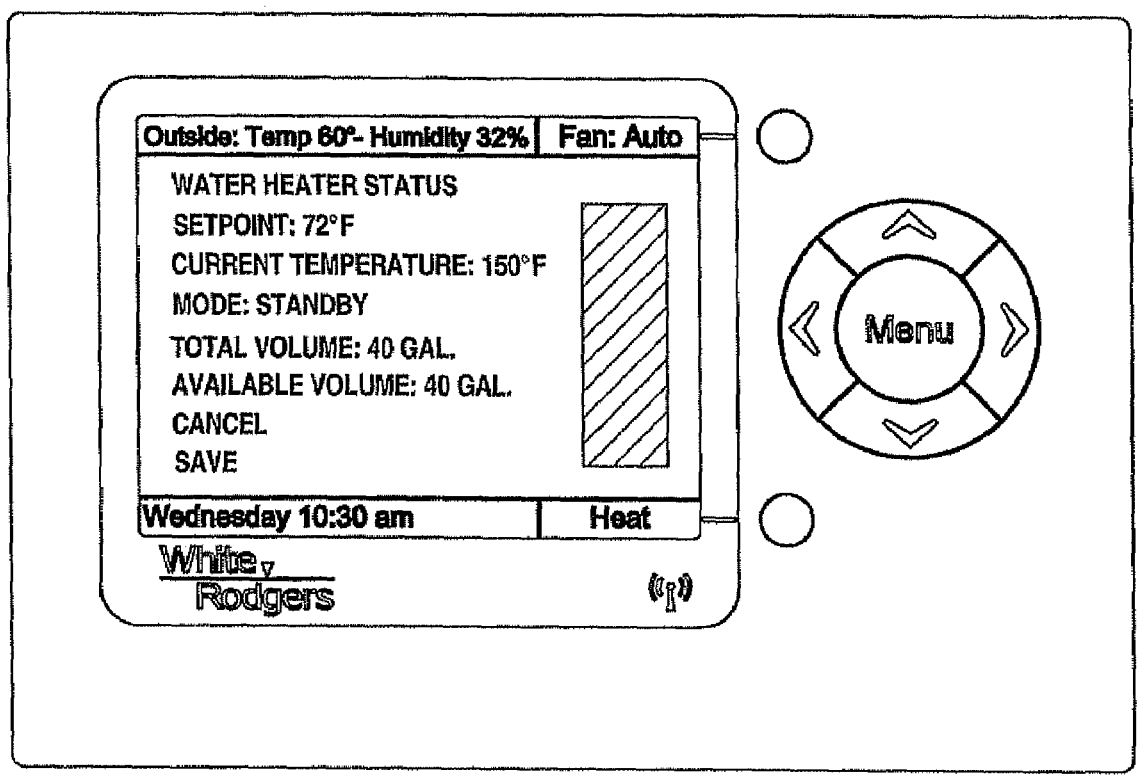
FIG. 12 is an illustration of a thermostat configured to receive and display information communicated by a water heater controller of the present application.

This remote display feature is especially helpful to an occupant where the water heater is installed in an attic or other inaccessible space where the controller 50 or its display device cannot be readily viewed. Additionally, the processor may communicate other water heater information, such as the water temperature sensed by sensor 52 or tank size information, for subsequent display as shown in FIGS. 10 and 11.

The above disclosed universal serial bus interface feature will enable a plumber or contractor to upload their contact information into the controller 50 for future use in the event of a malfunction. In addition, the contractor or service provider could also use a portable USB memory device 370 to connect to the universal serial bus interface 350 to download a history of fault information or operating characteristics. The information could be in text format which could be viewed on a computer or laptop 380, for example.

According to the present disclosure, a preferred embodiment of a control system for controlling a fuel-fired water heater appliance 20 is provided that is configured to control a burner 848 for heating water within tank 24 of the water heater 20 in FIG. 1, and also configured to communicate to a remotely located user-interface device. The control system comprises a lower sensor 52 disposed on a lower portion of the water heater 20 for sensing the temperature of water in the lower portion of the tank 24, and an upper sensor 53 disposed on an upper portion of the water heater 20 for sensing the temperature of water in the upper portion of the tank 24. The control system for the water heater further includes a water heater controller 50 mounted on the water heater 20, which is in communication with the lower sensor 52 and upper sensor 53 for controlling operation of burner 848 to heat the water in the water heater to a desired set-point temperature. The water heater controller 50 has a processor 56 that determines a first temperature differential between the user's set-point temperature and the sensed temperature of the upper sensor 53, and a second temperature differential between the user's set-point temperature and the sensed temperature of the lower sensor 52. The processor 56 calculates a value representing the portion of water within the tank that is at the desired set-point temperature, based in part on the first temperature differential and the second temperature differential.

The control system includes a transceiver means 330 associated with the controller 50 for wirelessly transmitting signals from the controller 50, which signals include the value representing the portion of water in the tank that is at the desired set-point temperature. The transmitter device 330 is in communication with an antenna device 332 that is either trace mounted on a circuit board of the controller 50 or a transmitter circuit 334, or externally mounted. The transmitter module 330 is configured to transmit at a frequency in the range of about 915 to 918 megahertz (MHz), but may alternatively transmit at other frequencies suitable for achieving wireless communication across the same distance, such as a distance of 20 to 40 feet with low power transmission levels (under 1 watt). However, the RF transceiver 230 may alternately be configured to transmit at 433 MHz, or any other frequency suitable for wireless communication across a short range distance. One example of an RF transceiver 330 that is capable of transmitting at frequencies in the range of 915 to 917 MHz, at varying power levels is a TXM-916-ES RF Module manufactured by LINX Technologies, Inc. This RF Module includes an input for receiving a digital signal (such as from a UART output of the microprocessor 50), and an LADJ input for external adjustment and control of the transmit power up to a maximum of 7 mill amperes (+4 dBm).

The control system further includes a user interface 360 having a transceiver means therein, for wirelessly receiving signals (not shown), and a display device 362, as shown in FIGS. 7-12. As shown in FIGS. 10-11, the display device 362 includes a plurality of selectively-illuminated segmented portions arranged to form or define a linear array 364, or bar gauge. The display device 362 selectively illuminates a number of the segmented portions corresponding to said value as shown in FIG. 11, to thereby provide a visual depiction representing the quantity of water, or portion of the total water volume physically contained within the tank, that is at the desired set-point temperature. For example, the display device 362 may include a linear array 364 having 4 segmented portions as shown in FIG. 10, which represent 100% of the water within the tank. The display device 362 depicted in FIG. 11 shows 3 of the 4 segmented portions being illuminated to indicate that ¾ of the water in the tank 24 is at the set-point temperature, such as 120 degrees Fahrenheit for example.

In at least one preferred embodiment, an algorithm may be used to calculate a value that is equal to a maximum number, less the average of both the first differential temperature (e.g.,—the set point temperature less the upper sensor temperature) divided by a default differential, and the second differential temperature (e.g.,—the set point temperature less the lower sensor temperature) divided by the default differential.

The above embodiment of a control system includes the following exemplary algorithm for determining a value V representing the portion of water within the tank that is at the desired set-point temperature, which is expressed as a function of a maximum number 4, less the average of both a first differential temperature divided by a default differential and a second differential temperature divided by the default differential. The function may be defined as:

$$V = N_{maximum} - [(T_{setpoint} - T_{upper\ sensor})/T_{differential} + (T_{setpoint} - T_{lower\ sensor})/T_{differential}]/2$$

where $T_{differential}$ is a temperature differential variable that is subtracted from the user's set-point temperature, to provide an "activation" temperature at which the control initiates heating operation to heat the water in the tank up to the desired set-point temperature. In the above algorithm, the maximum number is a value of 4, and the temperature differential variable is a value of 10 degrees Fahrenheit. However, it should be noted that the algorithm or function could include any maximum number corresponding to the number of displayed segmented portions which define an array or bar gauge. The calculated value may therefore be any maximum value, less an offset that is calculated based in part on the average of first differential temperature (e.g.,—the set point temperature less the upper sensor temperature) and the second differential temperature (e.g.,—the set point temperature less the lower sensor temperature).

With regard to the offset that is calculated based in part on the average of first differential and second differential temperatures shown below:

$$[(T_{set\ point} - T_{upper\ sensor})/T_{differential} + (T_{set\ point} - T_{lower\ sensor})/T_{differential}]$$

The calculated value for $(T_{set\ point} - T_{upper\ sensor})/T_{differential}$ may be limited to a maximum value, such as 3 for example, and the calculated value for $(T_{set\ point} - T_{lower\ sensor})/T_{differential}$ may be limited to a maximum value, such as 5 for example, such that the average of the maximum values 3+5 does not result in an offset greater than 4, the amount of the maximum number corresponding to the number of segmented portions. In this manner, where most of the water in the tank is substantially below the set-point temperature, the calculated value representing the portion of water in the tank at the desired set-point temperature would be limited to a minimum of zero (e.g.,—zero segmented portions indicating that no amount of water in the tank is at the desired set-point temperature).

Typically, when hot water is being drawn out of the hot water heater tank, cold supply water is being supplied to the tank and enters at the bottom of the tank. Additionally, water in upper portions of the tank that is at a lower temperature relative to the rest of the tank will fall, while water at higher temperatures will rise. Accordingly, as the tank is being heated and cold water enters the bottom of the tank, convection and the effects of heat rise result in the water at the top of the tank being higher than the bottom of the tank. Thus, over time, the water in the top of the tank may be closer in temperature to the user's set point temperature than the water in the bottom of the tank. During heating operation, the temperature of the water at both the upper and lower sensors will approach the user's set point temperature, and the temperature differentials between the sensed temperature and set-point temperature will approach zero. When this happens, the calculated value will be at the maximum number, indicating that all the water in the tank is at the desired set-point temperature. TABLE 1 below illustrates the rise in temperature in the water at both the bottom portion and top portion of a tank over a period of time in which heating occurs, and includes a corresponding calculation of the value representing the amount of water in the tank at the desired temperature over time.

TABLE 1

| Time (Min) | Upper Sensor Temperature ° F. | Lower Sensor Temperature ° F. | Calculated Value |
|---|---|---|---|
| 0 | 70 | 70 | 0 |
| 1 | 75 | 70 | 0 |
| 2 | 80 | 70 | 0 |
| 3 | 85 | 70 | 0 |
| 4 | 90 | 70 | 0 |
| 5 | 95 | 70 | 0 |
| 6 | 100 | 70 | 0 |
| 7 | 105 | 70 | 0 |
| 8 | 110 | 70 | 1 |
| 9 | 115 | 70 | 1 |
| 10 | 120 | 70 | 1 |
| 11 | 120 | 75 | 1 |
| 12 | 120 | 80 | 1 |
| 13 | 120 | 85 | 1 |
| 14 | 120 | 90 | 1 |
| 15 | 120 | 95 | 1 |
| 16 | 120 | 100 | 2 |
| 17 | 120 | 105 | 2 |
| 18 | 120 | 110 | 3 |
| 19 | 120 | 115 | 3 |
| 20 | 120 | 120 | 4 |

Figure 15:
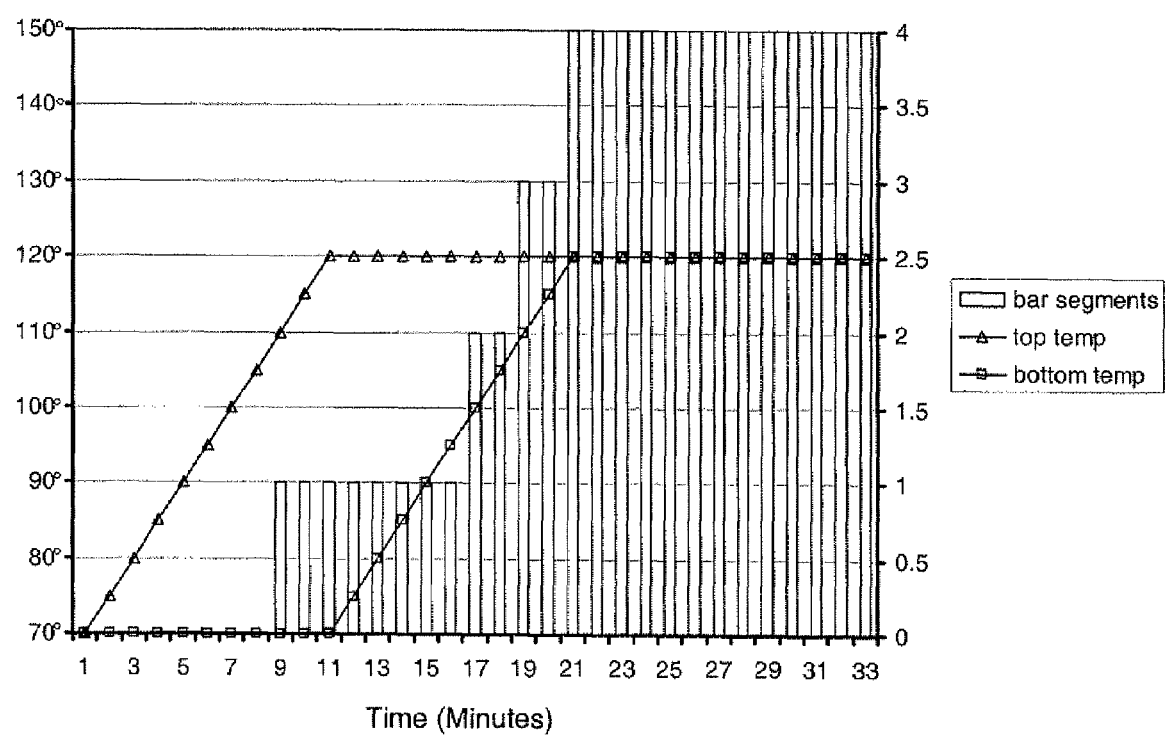
FIG. 15 is a graph illustrating the value calculated by the control system representing the amount of water in the tank at the set-point temperature.

The above TABLE values are further illustrated in FIG. 15, which shows the rise in temperature in the water at both the bottom portion and top portion of a tank, and the corresponding calculated value representing the amount of water in the tank at the desired temperature, with respect to time. As shown in the graph, the calculated number representing the portion of water in the tank at the desired set-point temperature is at a value of 4 when the temperatures sensed by the upper and lower sensors are both at or above the 120 degree set-point temperature.

New

In an alternate embodiment, a control system for controlling a fuel-fired water heater appliance 20 is provided that includes a water heater controller 50 mounted on the tank 24 of the appliance 20, and a remote user interface configured to receive data from the water heater controller and determine the amount of water within the tank that is at the desired temperature. The water heater controller 50 is configured to control a burner 848 for heating water within a tank 24 of the water heater 20 in FIG. 1, and also configured to communicate to a remotely located user-interface device. The water heater controller 50 receives temperature data from a lower sensor 52 disposed on a lower portion of the water heater 20 for sensing the temperature of water in the lower portion of the tank 24, and an upper sensor 53 disposed on an upper portion of the water heater 20 for sensing the temperature of water in the upper portion of the tank 24.

The control system further includes a transceiver means 330 associated with the controller 50 for wirelessly transmitting signals from the controller 50, which signals include the temperature value sensed by the upper and lower sensors, and the user's set point temperature setting. The transmitter device 330 is in communication with an antenna device 332 that is either trace mounted on a circuit board of the controller 50 or a transmitter circuit 334, or externally mounted. The transmitter module 330 is configured to transmit at a frequency in the range of about 915 to 918 megahertz (MHz), but may alternatively transmit at other frequencies suitable for achieving wireless communication across the same distance, such as a distance of 20 to 40 feet with low power transmission levels (under 1 watt) However, the RF transceiver 230 may alternately be configured to transmit at 433 MHz, or any other frequency suitable for wireless communication across a short range distance. One example of an RF transceiver 330 that is capable of transmitting at frequencies in the range of 915 to 917 MHz, at varying power levels is a TXM-916-ES RF Module manufactured by LINX Technologies, Inc. This RF Module includes an input for receiving a digital signal (such as from a UART output of the microprocessor 50), and an LADJ input for external adjustment and control of the transmit power up to a maximum of 7 mill amperes (+4 dBm).

The control system further includes a user interface 360 having a transceiver means therein, for wirelessly receiving signals (not shown), and a display device 362, as shown in FIGS. 7-12. As shown in FIGS. 10-11, the display device 362 includes a plurality of selectively-illuminated segmented portions arranged to form or define a linear array 364, or bar gauge. The display device 362 selectively illuminates a number of the segmented portions as shown in FIG. 11, to thereby provide a visual depiction representing the quantity of water, or portion of the total water volume physically contained within the tank, that is at the desired set-point temperature. For example, the display device 362 may include a linear array 364 having 4 segmented portions as shown in FIG. 10, which represent 100% of the water within the tank. The display device 362 depicted in FIG. 11 shows 3 of the 4 segmented portions being illuminated to indicate that ¾ of the water in the tank 24 is at the set-point temperature, such as 120 degrees Fahrenheit for example.

In this alternate embodiment of a control system, the user interface 360 has a processor (NN) that determines a first temperature differential between the user's set-point temperature and the sensed temperature of the upper sensor 53, and a second temperature differential between the user's set-point temperature and the sensed temperature of the lower sensor 52. The processor (NN) calculates a value representing the portion of water within the tank that is at the desired set-point temperature, based in part on the first temperature differential and the second temperature differential.

The user interface's processor employs an algorithm that determines a value V representing the portion of water within the tank at the desired set-point temperature. This value V is equal to some maximum number, less an offset that is calculated based in part on the average of both the first differential temperature (e.g.,—the set point temperature less the upper sensor temperature) divided by a default differential, and the second differential temperature (e.g.,—the set point temperature less the lower sensor temperature) divided by the default differential. The value may be determined by the same function expressed above:

$$V = N_{maximum} - [(T_{setpoint} - T_{upper\ sensor})/T_{differential} + (T_{setpoint} - T_{lower\ sensor})/T_{differential}]/2$$

where the $N_{maximum}$ may be a value of 4, for example. The calculated value for $(T_{setpoint} - T_{upper\ sensor})/T_{differential}$ may be limited to a maximum value, such as 3 for example, and the calculated value for $(T_{setpoint} - T_{lower\ sensor})/T_{differential}$ may be limited to a maximum value, such as 5 for example, such that the average of the maximum values 3+5 does not result in an offset greater than 4, the amount of the maximum number corresponding to the number of segmented portions.

In this manner, where most of the water in the tank is substantially below the set-point temperature, the calculated value representing the portion of water in the tank at the desired set-point temperature would be limited to a minimum of zero (e.g.,—zero segmented portions indicating that no amount of water in the tank is at the desired set-point temperature). During heating operation, the temperature of the water at both the upper and lower sensors will approach the user's set point temperature, and the temperature differentials between the sensed temperature and set-point temperature will approach zero. When this happens, the calculated value will be at the maximum number, indicating that all the water in the tank is at the desired set-point temperature. Thus, based on communication by the water heater controller of the user's set point temperature and the upper and lower sensor temperature readings, the user interface can calculate via an algorithm a value representing the portion of water within the tank that is at the desired set-point temperature. The user interface then selectively illuminates a number of segmented portions on a display device 362 as shown in FIG. 11, to thereby provide a visual depiction representing the quantity or portion of the total water volume physically contained within the tank 24 that is at the desired set-point temperature.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A control system for a gas-fired water heater having a burner for heating water within a tank of the water heater, the control system comprising:

a lower sensor disposed on a lower portion of the water heater for sensing the temperature of water in a lower portion of the tank;

an upper sensor disposed on an upper portion of the water heater for sensing the temperature of water in an upper portion of the tank;

a water heater controller in communication with the lower sensor and upper sensor for controlling burner operation to heat the water in the water heater to a desired set-point temperature, the water heater controller having a processor that receives a desired set-point temperature and sensed temperatures of both the upper and lower sensors, wherein the processor calculates a value representing the portion of water in the tank that is at the desired set-point temperature, based in part on a first temperature differential equal to the set-point temperature less the upper sensor temperature, and a second temperature differential equal to the set-point temperature less the lower sensor temperature;

a transceiver means for wirelessly transmitting signals including said value representing the portion of water in the tank at the desired set-point temperature;

a user interface having a transceiver means for wirelessly receiving signals, and a display device including a plurality of selectively-illuminated segmented portions arranged in a linear array, wherein the display device selectively illuminates a number of the segmented portions corresponding to said value, to thereby provide a visual depiction representing the portion of the water physically contained within the tank that is at the desired set-point temperature.

2. The control system of claim 1 wherein the water heater controller is mounted on the water heater, and the user interface is mounted in a location remote from the water heater.

3. The control system of claim 2 wherein the calculated value is equal to a maximum value, less an offset that is calculated based in part on the average of both the first differential temperature divided by a differential variable, and the second differential temperature divided by a differential variable.

4. The control system of claim 2 wherein the maximum number is an integer value of at least 4.

5. The control system of claim 2 wherein the differential variable is a value of at least 10.

6. The control system of claim 5 where the differential variable is a variable that is subtracted from the user's set-point temperature for determining an activation temperature at which the water heater controller initiates heating operation to heat the water in the tank up to the desired set-point temperature.

7. The control system of claim 2 wherein the value representing the portion of water within the tank that is at the desired set-point temperature is calculated based on the function defined as:

$$V = N_{maximum} - [(T_{setpoint} - T_{upper\ sensor})/T_{differential} + (T_{setpoint} - T_{lower\ sensor})/T_{differential}]/2.$$

8. The control system of claim 7 wherein the calculated value for $(T_{setpoint} - T_{upper\ sensor})/T_{differential}$ may be limited to a maximum value, and the calculated value for $(T_{set\ point} - T_{lower\ sensor})/T_{differential}$ may be limited to a maximum value, such that the calculation $[(T_{setpoint} - T_{upper\ sensor})/T_{differential} + (T_{setpoint} - T_{lower\ sensor})/T_{differential}]/2$ does not result in an offset greater than the maximum number $N_{maximum}$.

9. The control system of claim 8 wherein the maximum number is an integer value of at least 4.

10. The control system of claim 8 wherein the differential variable is a value of at least 10.

11. The control system of claim 1 wherein the calculated value is equal to a maximum number, less an offset that is calculated as the average of a first differential temperature value, which is equal to the set-point temperature less the upper sensor temperature, divided by a differential variable, and the second differential temperature, which is equal to equal to the set-point temperature less the upper sensor temperature divided by a differential variable, divided by a differential variable.

12. A control system for a gas-fired water heater appliance having a burner for heating water within a water-holding tank of the appliance, the control system comprising:

a lower sensor disposed on a lower portion of the water heater for sensing the temperature of water in the lower portion of the tank;

an upper sensor disposed on an upper portion of the water heater for sensing the temperature of water in the upper portion of the tank;

a water heater controller in communication with the lower sensor and upper sensor for controlling burner operation to heat the water in the water heater appliance to a desired set-point temperature, the water heater controller having a processor that receives a user-selected set-point temperature, and the sensed temperature from both the upper and lower sensor, wherein the processor transforms the temperature data by calculation of a value representing the portion of water within the tank that is at the desired set-point temperature, wherein the calculated value is equal to a maximum number, less an offset that is calculated as the average of a first differential temperature value, which is equal to the set-point temperature less the upper sensor temperature, divided by a differential variable, and the second differential temperature, which is equal to the set-point temperature less the upper sensor temperature divided by a differential variable, divided by a differential variable; and a transceiver means for wirelessly transmitting signals, the transceiver means transmitting a signal including said value representing the portion of water within the tank at the desired set-point temperature; and a user interface having a transceiver means for wirelessly receiving signals, and a display device including a plurality of selectively illuminated segmented portions thereon, wherein the display device selectively illuminates a number of segmented portions that corresponds to said value, to thereby provide a visual depiction that represents the specific portion of the water physically contained within the tank that is at the desired set-point temperature.

13. The control system of claim 12 wherein the value representing the portion of water within the tank that is at the desired set-point temperature is calculated based on the function defined as:

$$V = N_{maximum} - [(T_{setpoint} - T_{upper\ sensor})/T_{differential} + (T_{setpoint} - T_{lower\ sensor})/T_{differential}]/2.$$

14. The control system of claim 13 wherein the calculation for $(T_{set\ point} - T_{upper\ sensor})/T_{differential}$ may be limited to a maximum value, and the calculation for $(T_{set\ point} - T_{lower\ sensor})/T_{differential}$ may be limited to a maximum value, such that the calculation $[(T_{setpoint} - T_{upper\ sensor})/T_{differential} + (T_{setpoint} - T_{lower\ sensor})/T_{differential}]/2$ does not result in an offset greater than the maximum number $N_{maximum}$.

15. The control system of claim 14 wherein the maximum number $N_{maximum}$ is an integer value of at least 4.

16. The control system of claim 14 wherein the differential variable $T_{differential}$ is a value of at least 10.

17. A control system for a gas-fired water heater appliance having a burner for heating water within a water-holding tank of the appliance, the control system comprising:

a lower sensor disposed on a lower portion of the water heater for sensing the temperature of water in the lower portion of the tank;

an upper sensor disposed on an upper portion of the water heater for sensing the temperature of water in the upper portion of the tank;

a water heater controller mounted on the water heater that is in communication with the lower sensor and upper sensor for controlling burner operation to heat the water in the water heater appliance to a desired set-point temperature, the water heater controller having a processor that receives a user-selected set-point temperature, and the sensed temperature from both the upper and lower sensor, wherein the processor transforms the temperature differential data by calculation of a value representing the portion of water within the tank that is at the desired set-point temperature, said value being calculated based on the function defined as:

$$V = N_{maximum} - [(T_{setpoint} - T_{upper\ sensor})/T_{differential} + (T_{setpoint} - T_{lower\ sensor})/T_{differential}]/2$$

a transceiver means for wirelessly transmitting signals, the transceiver means transmitting a signal including said value representing the portion of water within the tank at the desired set-point temperature; and a user interface mounted in a location remote from the water heater, having a transceiver means for wirelessly receiving signals, and a display device including a plurality of selectively illuminated segmented portions that define a linear array thereon, wherein the display device selectively illuminates a number of segmented portions that corresponds to said value, to thereby provide a visual depiction that represents the specific portion of the water physically contained within the tank that is at the desired set-point temperature.

18. The control system of claim 17 wherein the calculated value representing the portion of water in the tank at the desired set-point temperature is at the maximum number $N_{maximum}$ when the water temperature sensed by both the upper and lower sensors is equal to or greater than the set point temperature.

19. The control system of claim 17 wherein the calculation for $(T_{set\ point} - T_{upper\ sensor})/T_{differential}$ may be limited to a maximum value, and the calculation for $(T_{set\ point} - T_{lower\ sensor})/T_{differential}$ may be limited to a maximum value, such that the calculation $[(T_{setpoint} - T_{upper\ sensor})/T_{differential} + (T_{setpoint} - T_{lower\ sensor})/T_{differential}]/2$ does not result in an offset greater than the maximum number $N_{maximum}$.

20. The control system of claim 17 wherein the maximum number $N_{maximum}$ corresponds to the number of selectively illuminated segmented portions, which represents 100 percent of the water contained within the tank of the water heater.

21. The control system of claim 17, wherein the maximum number $N_{maximum}$ is an integer value of at least 4, and the differential variable is a value of at least 10.

* * * * *